United States Patent
Schanzenbach et al.

(10) Patent No.: US 6,457,783 B1
(45) Date of Patent: Oct. 1, 2002

(54) WHEEL BRAKE APPARATUS AND METHOD FOR OPERATING IT

(75) Inventors: Matthias Schanzenbach, Eberstadt; Dieter Blattert, Kirchheim/neckar, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/905,919

(22) Filed: Jul. 17, 2001

(30) Foreign Application Priority Data

Jul. 20, 2000 (DE) .......................................... 100 35 220

(51) Int. Cl.[7] .............................. B60T 13/74; B60L 7/00; F16D 65/18; F16D 65/20; F16D 66/00
(52) U.S. Cl. .................. 303/115.2; 188/156; 188/158; 188/162; 188/72.1; 303/166; 303/DIG. 3
(58) Field of Search ............................... 303/115.2, 162, 303/20, DIG. 3, 166, DIG. 4, 13–18, 122.03–122.06; 188/72.1–72.8, 162, 158, 156, 157, 106 P, 106 F, 1.11 E, 1.11 L; 60/545

(56) References Cited

U.S. PATENT DOCUMENTS

| | | | | |
|---|---|---|---|---|
| 4,838,622 A | * | 6/1989 | Kircher et al. ............ | 303/115.2 |
| 5,148,894 A | * | 9/1992 | Eddy, Jr. .................. | 188/106 F |
| 5,302,008 A | * | 4/1994 | Miyake et al. ............ | 303/115.2 |
| 5,348,123 A | * | 9/1994 | Takahashi et al. ......... | 188/72.1 |
| 5,682,965 A | * | 11/1997 | Prinzler ...................... | 188/158 |
| 5,782,322 A | * | 7/1998 | Hauck et al. .............. | 188/72.4 |
| 5,957,246 A | * | 9/1999 | Suzuki ....................... | 188/72.1 |
| 6,145,634 A | * | 11/2000 | Holding ..................... | 188/72.8 |
| 6,179,097 B1 | * | 1/2001 | Schumann ................. | 188/162 |

FOREIGN PATENT DOCUMENTS

| | | | |
|---|---|---|---|
| DE | 19529664 | * | 2/1997 |
| EP | 0526273 | * | 2/1993 |
| WO | 9706998 | * | 2/1997 |

* cited by examiner

*Primary Examiner*—Douglas C. Butler
(74) *Attorney, Agent, or Firm*—Ronald E. Greigg

(57) ABSTRACT

The invention relates to a wheel brake apparatus having an electric motor, a rotation/translation conversion mechanism that can be driven to rotate by the electric motor, a hydraulic working piston that can be moved by the rotation/translation conversion mechanism, and a brake lining piston that can be hydraulically moved by the working piston. In order to permit an emergency actuation of the wheel brake apparatus in the event of a leak in the hydraulics, the invention proposes embodying the wheel brake apparatus so that the brake lining piston can also be mechanically moved by the working piston. This can be achieved by virtue of the fact that the two pistons are disposed coaxially.

18 Claims, 1 Drawing Sheet

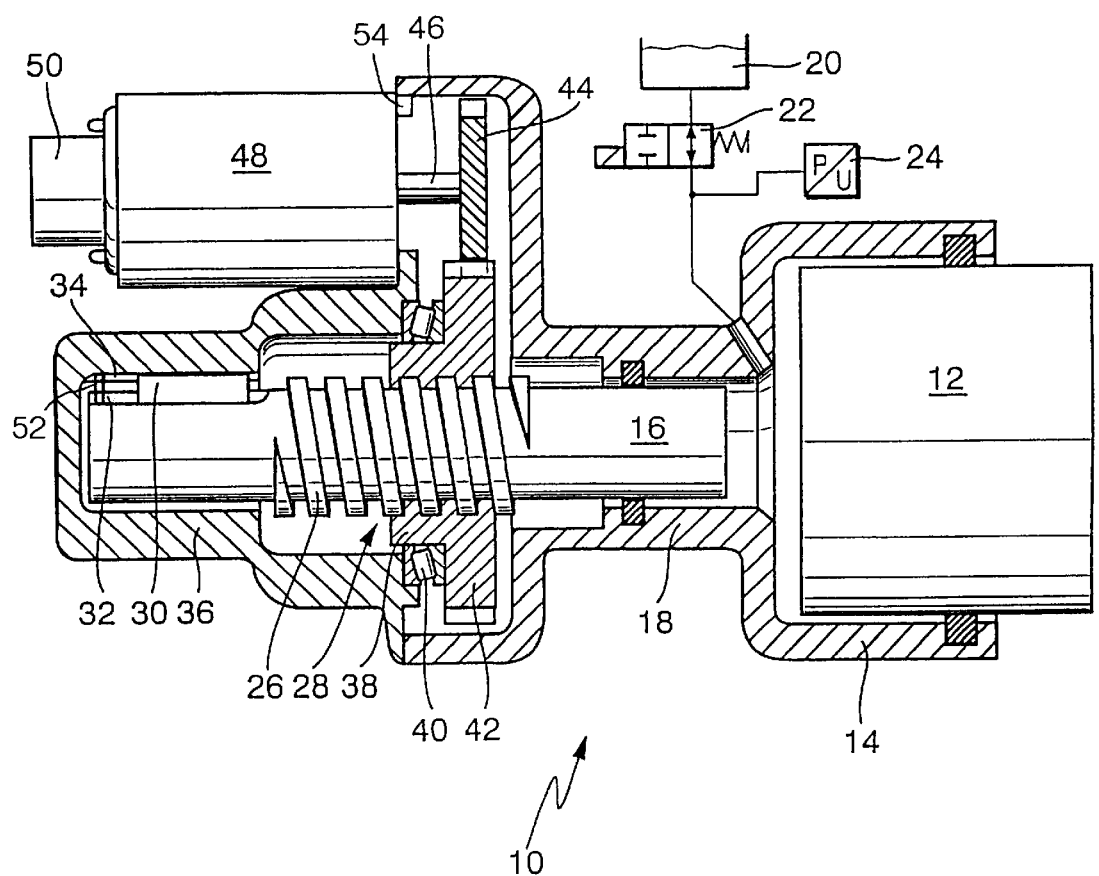

WHEEL BRAKE APPARATUS AND METHOD FOR OPERATING IT

BACKGROUND OF THE INVENTION

1. Field of the Invention

The invention relates to a wheel brake apparatus and a method for operating the wheel brake apparatus including an electric motor and a rotation/translation conversion mechanism.

2. Description of the Prior Art

A wheel brake apparatus of the type with which this invention is concerned is disclosed by DE 195 29 664 A1. The known wheel brake apparatus has an electric motor which can drive a rotation/translation conversion mechanism. The rotation/translation conversion mechanism of the known wheel brake apparatus is embodied as a helical gear. The rotation/translation conversion mechanism can move a hydraulically acting working piston in a working cylinder. The working cylinder communicates with a cylinder in which a brake lining piston is movably contained. The movement of the working piston in the working cylinder moves the brake lining piston in its cylinder and because the cylinder diameters are different, a hydraulic path reduction and force increase can be produced. The brake lining piston can press a frictional brake lining against a brake body non-rotatably connected to a vehicle wheel, for example a brake disk or brake drum, in order to produce a brake force or a brake moment. The known wheel brake apparatus combines an electromechanical drive mechanism with a hydraulic drive mechanism.

OBJECT AND SUMMARY OF THE INVENTION

In the wheel brake apparatus according to the invention, the rotation/translation conversion mechanism can be brought into a mechanical connection with the brake lining piston and as a result, the brake lining piston can be moved. This has the advantage that a parking brake function of the wheel brake apparatus can be produced which is independent of the hydraulics. A brake force built up in the parking brake function remains unchanged for a long time since the brake force is built up in an exclusively mechanical fashion and as a result, leakage losses in the hydraulics are prevented from reducing the brake force. Another advantage of the wheel brake apparatus according to the invention is its ability to be actuated in an exclusively mechanical fashion, for example in the event of a leak in the hydraulics of the wheel brake apparatus. This permits a mechanical emergency braking operation in the event of a malfunction in the hydraulics. In comparison to an exclusively electromechanical wheel brake apparatus, the wheel brake apparatus according to the invention has the advantage that it can easily be embodied with two or more brake lining pistons and can thus be inexpensively designed, for example in the form of a fixed yoke brake device.

According to one embodiment, a movable element of the rotation/translation conversion mechanism can be moved into contact with the brake lining piston and in this manner, the brake lining piston can be mechanically moved in order to press the frictional brake lining against the brake body. The movable element can be a spindle of a rotation/translation conversion mechanism embodied as a helical gear.

Another possibility for mechanically moving the brake lining piston is to provide the working piston so that it can be moved into contact with the brake lining piston.

In a preferred embodiment of the invention, the wheel brake apparatus has a valve that can be opened and closed, which is connected to the working cylinder and to the cylinder of the brake lining piston. When the valve is open, a hydraulic operational connection between the working piston and the brake lining piston is disengaged and the brake lining piston can be moved mechanically with the rotation/translation conversion mechanism. Moreover, opening the valve makes possible for the wheel brake apparatus to be released in the event of a malfunction in its electromechanical drive mechanism. The valve is preferably open in a normal position.

According to one modification, the wheel brake apparatus of the invention has a pressure sensor for measuring the hydraulic pressure. The pressure sensor can be used, for example, to determine a brake force of the wheel brake apparatus since the brake force is at least approximately proportional to the hydraulic pressure.

According to a further embodiment, the wheel brake apparatus according to the invention has a rotation angle sensor for the rotor of the electric motor or the rotation/translation conversion mechanism. The rotation angle sensor can measure a rotation angle of the rotor of the electric motor or of a rotating part of the rotation/translation conversion mechanism, in complete rotations and/or in fractions of a rotation. Since the rotation angle is proportional to a displacement path of the rotation/translation conversion mechanism, a displacement path of the rotation/translation conversion mechanism can therefore be determined. A displacement path sensor can also be added.

The correlation of the rotation angle measured with the rotation angle sensor and the hydraulic pressure measured with the pressure sensor permits the proper functioning of the wheel brake apparatus to be monitored. When the wheel brake apparatus is functioning properly, these two values maintain a particular proportion to each other in every operating state of the wheel brake apparatus. During operation of the wheel brake apparatus according to the invention, if the proportion of the two values to each other diverges significantly from their proportion during proper operation wheel brake apparatus, then this indicates a malfunction.

Instead of, or in addition to the rotation angle sensor, the wheel brake apparatus can also have a path sensor for the displacement path of the rotation/translation conversion mechanism.

According to another modification, the rotation/translation conversion mechanism of the wheel brake apparatus according to the invention is embodied as self locking-free so that when the electric motor is without current, a pressing force of the frictional brake lining against the brake body decreases to a negligible value. As a result, it is possible for the wheel brake apparatus to be released in the event of a failure of the power supply of the electric motor.

For the parking brake function, in order to maintain a brake force without current once the brake force has been exerted, a brake is provided with which the rotor of the electric motor or the rotation/translation conversion mechanism can be locked in place.

BRIEF DESCRIPTION OF THE DRAWING

The invention will be better understood and further objects and advantages thereof will become more apparent from the ensuing detailed description of preferred embodiments taken in conjunction with the drawing, which shows a partially simplified schematic representation of an axial section through a wheel brake apparatus according to the invention.

DESCRIPTION OF THE PREFERRED EMBODIMENTS

The wheel brake apparatus 10 according to the invention shown in the drawing has a brake lining piston 12, which is movably contained in a cylinder 14. The brake lining piston 12 can press a frictional brake lining, which is not shown and is in contact with the brake lining piston 12, against a brake body, likewise not shown, for example a brake disk, in order to produce a brake moment or a brake force in an intrinsically known manner.

In order to move the brake lining piston 12, the wheel brake apparatus 10 has a working piston 16, which is movably contained in a working cylinder 18. The working piston 16 is disposed coaxial to the brake lining piston 12; it has a smaller diameter than the brake lining piston 12. The working cylinder 18 and the cylinder 14 of the brake lining piston 12 are hydraulic cylinders which are operationally connected to each other. In the exemplary embodiment shown, the working cylinder 18 and the cylinder 14 of the brake lining piston 12 are of one piece with each other; the working cylinder 18 coaxially adjoins the cylinder 14 of the brake lining piston 12. The working cylinder 18 is connected to a brake fluid storage tank 20 which is operationally connected to the working cylinder 18 and therefore also the cylinder 14 of the brake lining piston 12 by means of a solenoid valve 22. The solenoid valve is embodied as a 2/2-way solenoid valve that is open in its currentless normal position. In addition, a pressure sensor 24 is connected to the working cylinder 18 and can measure a hydraulic pressure in the working cylinder 18 and the cylinder 14 of the brake lining piston 12.

The working piston 16 is a one-piece component of a spindle 26 of a helical gear 28. The helical gear 28 constitutes a rotation/translation conversion mechanism, or screw link actuator. Instead of the helical gear 28, another kind of rotation/translation conversion mechanism can also be used, for example a recirculating ball transmission or a planetary roller screw drive (not shown). For rotational securing, the spindle 26 has a slide key or spring 30, which rests in an axially parallel groove 32 of the spindle 26 and in an axially parallel groove 34 in a housing 36 of the wheel brake apparatus 10.

In order to axially move the spindle 26 together with a working piston 16 that is of one piece with it, the helical gear 28 has a nut 38 which engages with the spindle 26. The nut 38 is rotatably supported in the housing 36 by an angular roller bearing 40 and is supported axially against the housing 36 by this angular roller bearing 40. The screw link actuator 28 is self locking-free, i.e. axial pressure in the spindle 26 can set the nut 38 into rotation and move the spindle 26 axially.

The nut 38 of the helical gear 28 is of one piece with a gear 42, which meshes with a smaller diameter gear 44. The two gears 42, 44 constitute a toothed wheel-work. The smaller gear 44 is non-rotatably connected to a motor shaft 46 of an electric motor 48. The electric motor 48 has an integrated rotation angle sensor, 54, for its motor shaft 46. A magnetically actuatable brake is flange-mounted to the electric motor 48 and will be referred to below as a magnetic brake 50. The magnetic brake 50 has a stable brake position in which it fixes the motor shaft 46 in place. In order to release the magnetic brake 50, it is supplied with current. The magnetic brake 50 can be designed as bistable, i.e. it remains without current both in the braked position and in a released position and is supplied with current only for switching between the braked position and the released position and vice versa. Magnetic brakes of this kind are intrinsically known to the specialist in a number of embodiments, both in a monostable and bistable design, and therefore the construction of the magnetic brake 50 requires no further discussion at this point.

The toothed wheel-work 42, 44 is a mechanical reduction gear; a moment transmission from the electric motor 48 to the nut 38 of the helical gear 28 occurs here. Because of the smaller diameter of the working piston 16, a hydraulic reduction of the displacement path and an increase of the force of the working piston 16 against the brake lining piston 12 also take place.

Function of the Wheel Brake Apparatus

In order to actuate the wheel brake apparatus 10, the magnetic brake 50 is released, the solenoid valve 22-is closed, and the electric motor 48 is supplied with current in a brake-applying direction. The toothed wheel-work 42, 44 sets the nut 38 of the helical gear 28 into rotation and moves the spindle 26, together with the working piston 16 that is of one piece with it, toward the brake lining piston 12. The working piston 16 displaces brake fluid from the working cylinder 18 into the cylinder 14 of the brake lining piston 12 and therefore moves the brake lining piston 12. This produces a force transmission from the working piston 16 to the brake lining piston 12 in the proportion of their two diameters. In an intrinsically known manner, the brake lining piston 12 presses the frictional brake lining, not shown, against the brake body, not shown, and therefore exerts a brake moment or a brake force on the brake body.

In order to reduce the brake force and to restore the wheel brake apparatus 10, the electric motor 48 is supplied with current in a reverse rotation direction, as a result of which the toothed wheel-work 42, 44 and the helical gear 28 move the working piston 16 and therefore also the brake lining piston 12 back. The hydraulic pressure in the working cylinder 18 and in the cylinder 14 of the brake lining piston 12 is measured by the pressure sensor 24. Since the hydraulic pressure is proportional to a force with which the brake lining piston 12 presses the frictional brake lining against the brake body, the pressing force of the frictional brake lining against the brake body and therefore the brake force of the wheel brake apparatus 10 can be determined from the hydraulic pressure measured by the pressure sensor and can be regulated in relation to a reference value.

Parking Brake Function, Emergency Brake Function

In order to be used as a parking brake, when the magnetic brake 50 is released, the electric motor 48 is supplied with current and the working piston 16 is moved in the above-described manner until it strikes against the brake lining piston 12. The solenoid valve 22 thus remains open so that brake fluid displaced by the working piston 16 flows out into the brake fluid storage tank 20. With the working piston 16 resting against the brake lining piston 12, the brake lining piston 12 is moved further until the frictional brake lining, not shown, rests against the brake body. Through a continued supply of current to the electric motor 48, the working piston 16 resting against the brake lining piston 12 presses the frictional brake lining against the brake body and thus produces a brake force. The magnetic brake 50 is brought into its braking position and locks the motor shaft 46 in place. The supply of current to the electric motor 48 can be stopped; the magnetic brake 50 uses the toothed wheel-work 42, 44 to keep the nut 38 of the helical gear 28 from rotating and therefore also locks the spindle 26 and the working piston 16 in place. The brake force exerted due to the supply of current to the electric motor 48 is retained when the electric motor 48 is without current. The brake force is exerted and maintained mechanically through the contact of the working piston 16 against the brake lining piston 12, without the hydraulic action of the brake fluid, so that once applied, the brake force is not reduced by possible leakage losses.

An emergency brake function is possible in the same way as the parking brake function. If the hydraulic transmission of the movement of the working piston 16 to the brake lining piston 12 fails, for example due to the lack of brake fluid or due to leakage, the working piston 16 can be moved into contact with the brake lining piston 12 and the brake lining piston 12 can be mechanically displaced by means of the working piston 16 resting against it.

Function Monitoring

The hydraulic pressure measured with the pressure sensor 24 and the rotation angle of the motor shaft 46 measured by the integrated rotation angle sensor of the electric motor 48 retain a particular relationship to each other in every operating state of the wheel brake apparatus 10. The term rotation angle is understood to mean a number of complete rotations and/or a fraction of a rotation. For example, when the solenoid valve 22 is closed, if the electric motor 48 is supplied with current in order to build up a brake force and therefore its motor shaft 46 is set into rotation, then the working piston 16 and the brake lining piston 12 are thus displaced. Only a slight amount of hydraulic pressure builds up before the frictional brake lining comes into contact with the brake body. As soon as the frictional brake lining comes into contact with the brake body, the hydraulic pressure increases with further rotation of the motor shaft 46. This dependence of the hydraulic pressure on the rotation angle of the motor shaft 46 is used to monitor the function of the wheel brake apparatus 10. To that end, the actually prevailing hydraulic pressure and the rotation angle of the motor shaft 46 are measured and compared to reference values associated with a properly functioning wheel brake apparatus 10. If the measured values diverge from the reference values by more than a fixed, permissible tolerance, this indicates a malfunction of the wheel brake apparatus 10. This function monitoring can also take place when a motor vehicle equipped with the wheel brake apparatus 10 according to the invention is not running. The function monitoring of the wheel brake apparatus 10 can, for example, be automatically executed when the engine of the vehicle is started, before driving begins.

A heating of the brake fluid during braking can be determined in the following way: if the brake fluid in the working cylinder 18 and in the cylinder 14 of the brake lining piston 12 heats up due to frictional heat during a braking maneuver, then the brake fluid expands. The hydraulic pressure is higher than the known hydraulic pressure which would prevail at the same rotation angle of the motor shaft 46 with cold brake fluid. The increased hydraulic pressure permits the temperature increase to be detected or also calculated. As a result, a warning can be given well before a critical temperature of the hydraulic fluid is reached.

Even when driving while not using the brakes, the brake fluid can be checked for heating. This can be the case when there is insufficient air play an absence thereof, i.e. when the frictional brake lining continuously rests against the brake body due to a mechanical malfunction. In order to test for such a temperature increase of the brake fluid when the wheel brake apparatus 10 is not being actuated, the solenoid valve 22 is closed and the hydraulic pressure is measured by the pressure sensor 24. If the brake fluid heats up, then the brake fluid expands and the hydraulic pressure increases.

Determination of the Air Play

The air play determination takes place during the above-described actuation of the wheel brake apparatus 10 through the monitoring of the hydraulic pressure by means of the pressure sensor 24. Until the frictional brake lining contacts the brake body, an increase in the hydraulic pressure is slight and the hydraulic pressure remains virtually constant. As soon as the frictional brake lining rests against the brake body, the hydraulic pressure increases. The number of rotations of the motor shaft 46 can be used to determine the displacement path of the brake lining piston 12 and therefore the air play up until the pressure increase, i.e. until the frictional brake lining comes into contact with the brake body. Alternatively, a displacement path sensor 52 can be used to sense the displacement path of working piston 16. If the air play is too great, for example due to a wear on the brake lining, then it is adjusted by virtue of the fact that the motor shaft 46 is turned back less during the release of the wheel brake apparatus 10 than it was turned in the brake-applying direction when the wheel brake apparatus 10 was applied.

The distance of the working piston 16 from the brake lining piston 12 can be determined in the following manner: by supplying current to the electric motor 48 while the solenoid valve 22 is open, the working piston 16 is moved toward the brake lining piston 12. The working piston 16 thus displaces brake fluid from the working cylinder 18, as a result of which the hydraulic pressure increases slightly. As soon as the working piston 16 strikes against the brake lining piston 12 and moves it, the larger diameter brake lining piston 12 aspirates brake fluid into the working cylinder 18 and the cylinder 14 of the brake lining piston 12, the hydraulic pressure drops to a negative pressure. The number of rotations of the motor shaft 46 until the drop in the hydraulic pressure when the working piston 16 strikes against the brake lining piston 12 can be used to determine the displacement path that the working piston 16 has traveled and thereby the starting distance between the working piston 16 and the brake lining piston 12 and can be adjusted when the working piston 16 is reset.

Releasing in the Event of a Malfunction

In the event of a malfunction, the wheel brake apparatus 10 can be released in two ways. On the one hand, when the wheel brake apparatus 10 is being actuated, the solenoid valve 22 can be opened and as a result, the wheel brake apparatus 10 can be released even in the event of a jammed helical gear 28, for example. If the working piston 16 is resting against the brake lining piston 12, then the second possibility for releasing the wheel brake apparatus 10 lies in releasing the magnetic brake 50. When the wheel brake apparatus 10 is being actuated and the magnetic brake 50 is released, the brake lining piston 12 moves the working piston 16 and the spindle 26 of the self locking-free screw link actuator 28 back until the brake force exerted by the frictional brake lining on the brake body has decreased to a residual brake force.

The foregoing relates to a preferred exemplary embodiment of the invention, it being understood that other variants and embodiments thereof are possible within the spirit and scope of the invention, the latter being defined by the appended claims.

We claim:

1. In a wheel brake apparatus that has an electric motor, a rotation/translation conversion mechanism that can be driven to rotate by the electric motor, a working piston that is movably contained in a working cylinder and can be moved by the rotation/translation conversion mechanism, and a brake lining piston that is movably contained in a cylinder, wherein the working cylinder and the cylinder of the brake lining piston are operationally connected, the improvement wherein the rotation/translation conversion mechanism (28) is operable to provide a mechanical connection with the brake lining piston (12) and as a result to thereby move the brake lining piston (12), wherein a movable driven element (26) of the rotation/translation conversion mechanism (28) can be moved into contact with the brake lining piston (12), and a valve (22) is connected to the working cylinder (18) and/or to the cylinder (14) of the brake lining piston (12).

2. The wheel brake apparatus according to claim 1, wherein the working piston (16) can be moved into contact with the brake lining piston (12).

3. The wheel brake apparatus according to claim 1, wherein the valve (22) is open in a normal position.

4. The wheel brake apparatus according to claim 1, wherein the wheel brake apparatus (10) further comprises a pressure sensor (24) connected to the working cylinder (18) and the cylinder (14) of the brake lining piston (12).

5. The wheel brake apparatus according to claim 1, wherein the wheel brake apparatus (10) has a rotation angle sensor which can measure a rotation angle of a rotor of the electric motor (48) or of the rotation/translation conversion mechanism (28).

6. The wheel brake apparatus according to claim 1, wherein the wheel brake apparatus (10) has a path sensor which can measure a displacement path of the driven element (26) of the rotation/translation conversion mechanism (28).

7. The wheel brake apparatus according to claim 1, wherein the rotation/translation conversion mechanism (28) is self locking-free.

8. The wheel brake apparatus according to claim 7, wherein the wheel brake apparatus (10) further comprises a brake (50) which can lock in place a rotor of the electric motor (48) or of the rotation/translation conversion mechanism (28).

9. The wheel brake apparatus according to claim 8, wherein the brake (50) has a stable brake position.

10. The wheel brake apparatus according to claim 8, wherein the brake (50) is a magnetic brake.

11. A method for operating a wheel brake apparatus of the type having an electric motor, a rotation/translation conversion mechanism that can be driven to rotate by the electric motor, a working piston that is movably contained in a working cylinder and can be moved by the rotation/translation conversion mechanism, and a brake lining piston that is movably contained in a cylinder, wherein the working cylinder and the cylinder of the brake lining piston are operationally connected, the method comprising measuring a hydraulic pressure in the working cylinder (18) and/or in the cylinder (14) of the brake lining piston (12) and measuring a displacement path of a movable driven element (26) of the rotation/translation conversion mechanism (28), and comparing the two measurement values to reference values associated with a properly functioning wheel brake apparatus (10).

12. The method according to claim 11, wherein when the wheel brake apparatus (10) is actuated, the hydraulic pressure in the working cylinder (18) and/or in the cylinder (14) of the brake lining piston (12) is measured and compared to a reference value.

13. The method according to claim 11, further comprising connecting a valve (22) to the working cylinder (18) and/or the cylinder (14) of the brake lining piston (12) and, when the wheel brake apparatus (10) is not actuated, closing the valve (22) and monitoring the hydraulic pressure in the working cylinder (18) and/or in the cylinder (14) of the brake lining piston (12) for a pressure increase.

14. The method according to claim 11, wherein when the wheel brake apparatus (10) is actuated, the chronological progression of the hydraulic pressure in the working cylinder (18) and/or in the cylinder (14) of the brake lining piston (12) is monitored and a displacement path of the driven element (26) of the rotation/translation conversion mechanism (28) is measured up to a break point in the pressure progression at the transition from a virtually constant, low hydraulic pressure to a mounting hydraulic pressure.

15. The method according to claim 11, wherein when the brake (50) is released and the valve (22) is open, the electric motor (48) is driven to rotate in a brake-applying direction, that the chronological progression of the hydraulic pressure is measured, and that the displacement path of the driven element (26) of the rotation/translation conversion mechanism (28) is measured up to the transition of the hydraulic pressure from an overpressure to a negative pressure.

16. The method according to claim 11, wherein in order to actuate the wheel brake apparatus (10), the brake (50) is released, the valve (22) is closed, and the electric motor (48) is supplied with current in a brake-applying direction.

17. The method according to claim 11, wherein in order to release the wheel brake apparatus (10), the brake (50) is released and when the valve (22) is closed, the electric motor (48) is supplied with current in a reverse rotation direction.

18. The method according to claim 11, wherein, for an emergency actuation of the wheel brake apparatus (10), the brake (50) is released and when the valve (22) is open, the electric motor (48) is supplied with current in a brake-applying direction.

* * * * *